No. 789,148. PATENTED MAY 9, 1905.
H. J. FORST.
NUT LOCK.
APPLICATION FILED MAY 23, 1904.
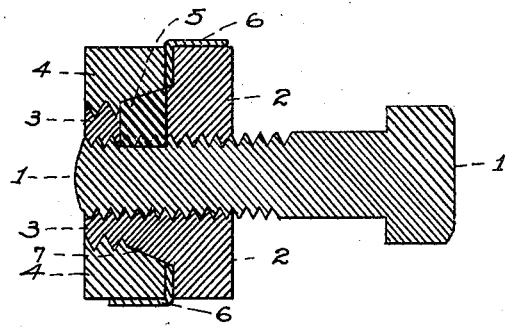
FIG 1.
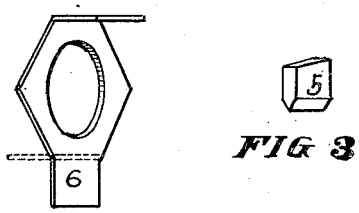
FIG 3.
FIG. 2.
Witnesses
J. H. Kappa
S. C. Norris.
Inventor.
Henry J. Forst,
By Abraham Knobel
Attorney.

No. 789,148.

Patented May 9, 1905.

UNITED STATES PATENT OFFICE.

HENRY JOHN FORST, OF LOUISVILLE, KENTUCKY.

NUT-LOCK.

SPECIFICATION forming part of Letters Patent No. 789,148, dated May 9, 1905.

Application filed May 23, 1904. Serial No. 209,326.

*To all whom it may concern:*

Be it known that I, HENRY JOHN FORST, a citizen of the United States, residing at Louisville, in the county of Jefferson and State of Kentucky, have invented a new and useful Nut-Lock, of which the following is a specification.

The objects of my invention are to provide a nut that may be fastened securely on its bolt and removed without destroying or injuring the nut or the bolt, simplicity, security, and to provide a device that allows neither the nut nor the bolt to turn relatively the one to the other. These objects I attain by means of the mechanism illustrated in the accompanying drawings, in which—

Figure 1 is a longitudinal section; Fig. 2, a perspective view of the locking-plate, and Fig. 3 a perspective view of the locking-key.

Similar reference-numerals refer to similar parts throughout the several views of the drawings.

The nut 2 is internally threaded to fit a standard bolt 1. It may be made square or hexagon or any other suitable shape. About one-half of the nut on the outside or opposite the bearing-surface is reduced in size and externally threaded, forming the gland 3. Only the outer portion (approximately one-half) of the part 3 is threaded, and the inner portion adjacent to the shoulder is tapered, as shown at 7. This tapered portion 7 is slotted longitudinally to receive the locking-key 5. A locking sleeve or nut 4, internally threaded and bored with a taper corresponding to the reduced portion of nut 2 and having corresponding faces with nut 2, is adapted to screw on over the portion 3. A thin plate 6, of malleable material, preferably soft steel, pierced with a central hole, is adapted to fit over the base of tapered portion 7. This plate 6 has opposite extensions or wings, one of which is bent at right angles to the main body of the plate and the other left straight. The plate 6 is preferably formed to correspond with the shape of the nut, and the extension or wing that is bent at right angles is adapted to fit snugly against one of the faces of either nut 2 or sleeve 5.

In use nut 2 is screwed down firmly in the usual way, key 5 is then placed in its slot, plate 6 is placed over the tapered portion 7, perhaps, preferably, with the right-angled wing extending outward, and sleeve 4 is started on. The internal taper of sleeve 4 soon begins to bind upon the tapered top edge of key 5. When sleeve 4 is forced on with a wrench, the sharp edge of key 5 is forced into the threads of bolt 1, so that when sleeve 4 has been screwed home against plate 6 the sharp edge of key 5 will have gone to the bottom of the threads. Sleeve 4 is turned until its faces register with those of nut 2. The straight wing of plate 6 is then hammered down over the adjacent face of nut 2, and it is impossible for sleeve 4 to unscrew from the portion 3, the key 5 is held firmly in position, and the nut 2 can be removed from bolt 1 only by stripping off the threads. When it is desired to remove the nut, one of the wings of plate 6 is bent up straight, when sleeve 4 may readily be unscrewed and taken off. Then if nut 2 is unscrewed the key 5 will rise out of its slot and allow the nut to be removed without injuring the threads.

It will be understood that the nut may readily be replaced as it was put on in the beginning.

Having thus described my invention so that any one skilled in the art pertaining thereto may make and use it, what I claim as my invention, and desire to secure by Letters Patent, is—

1. In a nut-lock, the combination of a nut having the upper portion reduced and the reduced portion externally threaded and provided with a longitudinal slot through its wall, an edged key in said slot having its outer edge tapered longitudinally, and a flaring and internally-threaded sleeve for covering and forcing said edged key transversely into the threads of the bolt and locking it, substantially as specified.

2. In a nut-lock, the combination of a nut having the upper portion reduced in diameter, tapered and externally threaded and the tapered portion longitudinally slotted, an edged tapered key adapted to fit snugly into the slot of said nut, and means for forcing said key into the threads of the bolt and locking it, substantially as specified.

3. In a nut-lock, the combination of a nut having the upper portion reduced, tapered and externally threaded and the tapered portion longitudinally slotted, an edged and tapered key in the slot of the slotted portion, a sleeve internally threaded and tapered to correspond with the reduced portion of said nut and adapted to be screwed onto said reduced portion and over said key and force it into the threads of the bolt and lock it, and means for locking said nut and said sleeve from turning the one relative to the other, substantially as specified.

4. In a nut-lock, the combination of a nut having its upper portion reduced, tapered and externally threaded and the tapered portion longitudinally slotted, an edged and tapered key in the slot of the slotted portion, a sleeve internally threaded and tapered to correspond with the reduced portion of said nut and adapted to be screwed onto said reduced portion and over said key and force it into the threads of the bolt and lock it, and a flexible plate pierced with a central hole and adapted to fit over the tapered portion of said nut and having diametrically-disposed extensions or wings, the one bent at right angles over one of the faces of either said nut or said sleeve and the other adapted to be bent over one of the faces of either said nut or said sleeve subsequent of setting up said sleeve for the purpose of locking said nut and said sleeve together, substantially as and for the purpose specified.

HENRY JOHN FORST.

Witnesses:
ABRAHAM KNOBEL,
STELLA C. NORRIS.